United States Patent [19]

Barber et al.

[11] 4,183,601

[45] Jan. 15, 1980

[54] TERMINAL POST

[75] Inventors: Robert J. Barber, Carleton Place; Francis R. Campbell, Ottawa, both of Canada

[73] Assignee: Northern Telecom Limited, Montreal, Canada

[21] Appl. No.: 947,592

[22] Filed: Oct. 2, 1978

[51] Int. Cl.² .................................... H01R 13/44
[52] U.S. Cl. ........................... 339/44 R; 174/48; 339/198 J
[58] Field of Search .............. 339/44, 198 J; 174/48, 174/52 R

[56] References Cited

U.S. PATENT DOCUMENTS 3,564,485  2/1971  Cull et al. ................. 339/198 J
3,721,762  3/1973  Gooding ........................ 174/48

*Primary Examiner*—Joseph H. McGlynn
*Attorney, Agent, or Firm*—Achmed N. Sadik

[57]  ABSTRACT

A terminal post is provided, for terminating buried cable, made of extruded aluminum and providing full access to the connector blocks housed inside by means of fully removable cover and a doubly hinged panel.

8 Claims, 8 Drawing Figures

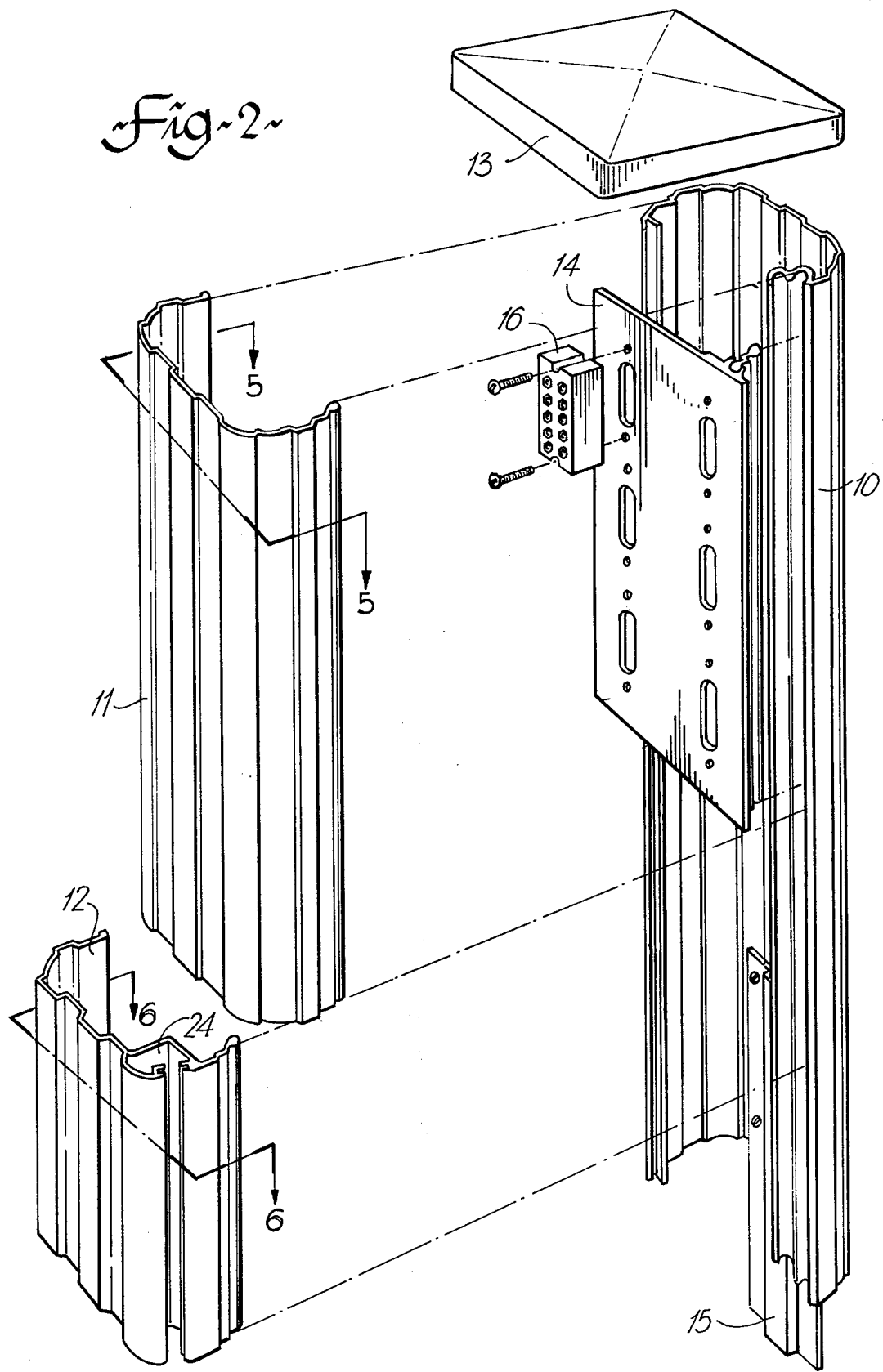

TERMINAL POST

FIELD OF THE INVENTION

The present invention relates to terminal posts for housing connector blocks or other telephone company equipment. In particular, it relates to terminal posts for terminating or interconnecting buried wire cable.

BACKGROUND AND SUMMARY OF THE INVENTION

Buried cable, such as extensively used by telephone companies around the world, must eventually surface. Most commonly, buried cable surfaces in the vicinity of residential areas, where it is interconnected to distribution wires ending in homes and businesses. At the point of interface, ease of access is important so that changes may be efficiently accomplished by the installation personnel of the telephone company. In addition, it is necessary that the interface terminal be as unobtrusive as possible in order not to disfigure the urban landscape.

The above-mentioned two requirements are reconciled in the buried cable terminal subject of the present invention. The present invention provides a relatively slim terminal post that, in addition to providing for relatively easy interconnection by telephone company craftspeople, satisfies the necessary requirement that the terminal may move up and down relative to the terminal cable inside. This movement of the housing occurs due to severe seasonal temperature variations. The cable, buried deeper in the ground, is not affected appreciably and does not move in unison with the housing. If the relative movement were not provided for, rupture of the cable and disconnection will ensue.

The present invention thus provides a terminal post housing for wire connector blocks and the like, comprising a hollow housing having a removable front part and a back part, one of said front and back parts having a vertical arcuate channel in its outer surface proximate and parallel to its edge, adapted to receive and engage, by rotation relative to the other of said front and back parts into closed position, a bead of compatible shape and cross-section along at least a portion of an opposite edge of said other part and, inside said terminal post housing a vertical panel or frame (for supporting said wire connector blocks and the like) hinged at one vertical edge thereof to said back part of the housing such as to permit substantial frontal access to its back side when said front part is removed.

The present invention will be better understood through the following detailed description of a preferred embodiment in conjunction with the accompanying drawings in which:

FIG. 2 is an exploded view of the terminal post of FIG. 1;

DETAILED DESCRIPTION OF THE PREFERRED EMBODIMENT

Figure 1:
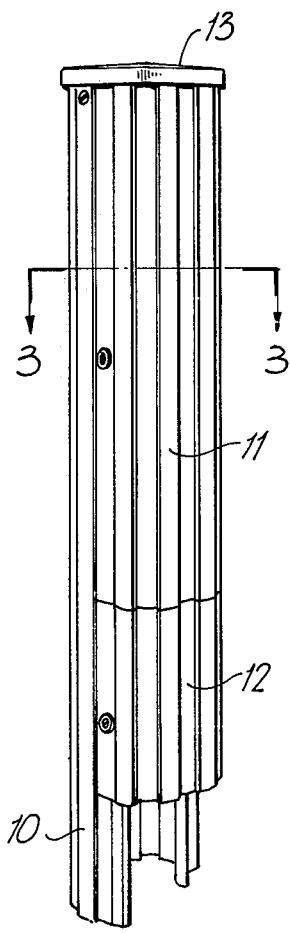
FIG. 1 is an outside perspective view of the terminal post according to the present invention.

With reference to FIGS. 1 and 2, the terminal post housing is basically rectangular in cross-section and comprises a back part 10 having a U-shaped cross-section, two front parts 11 and 12 of similar cross-section, and top cover 13. Inside the terminal post housing a terminal panel 14 is doubly and slidably hinged to the back part 10, as will be explained in more detail later on. The flutings in the walls of the terminal post housing serve the double purpose of providing structural strength and visual appeal, in addition to discouraging graffiti. Such housing walls and parts are preferably formed of extruded aluminum, protected by baked enamel where appropriate.

The back panel 10 (normally 1.2 m long for 25 wire pair terminating capacity) may be mounted on a 1.2 m steel stake 15 driven into the bottom of a cable trench. In soft soil a longer stake may be necessary. The back part 10 may also be slidably mounted on a stake for added freedom of movement of cable relative to the housing. In this case a 1.8 m stake guides two sliding brackets fastened to the back of the post 10, so that the stake is on the outside of the terminal post, rather than inside as shown in FIG. 2.

Figure 3:
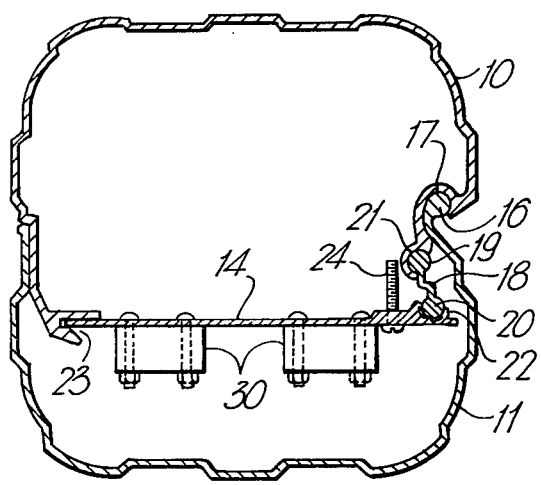
FIG. 3 is a cross-section of the terminal post along the plan 3—3 in FIG. 1.

Turning now to FIG. 3, it depicts a cross-section in the plane 3—3 (FIG. 1) of the terminal post in its normal, closed position. The front part 11, having a bead 16 along its one edge engaged with a compatible arcuate channel 17 along an edge of the back part 10. To separate the parts 10 and 11 from one another and open the terminal post, the front part is swung open from left to right so that the bead 16 slides out of the channel 17. The front part is thereby fully removable, giving full access to the terminal panel 14 inside, which supports the terminal blocks 30. The panel 14 itself is double hinged via a double beaded link member 18. The link member 18 has two cylindrical beads, one, 19, engaged in a compatible cylindrical channel 21 along the edge of the back part 10, and another, 20, engaged in compatible cylindrical channel 22 in the panel 14. The link member 18 must be inserted vertically into the channels 21 and 22, the openings in which span angles of less than 180°, so that the beads do not slide out once inserted.

The terminal panel 14, once the front part 11 has been removed, may thus be swung open around an angle approaching 180° or more to fully expose to the craftsman the back side thereof. In its closed position, the panel 14 fits into a vertical retaining groove 23 with its right hand edge. In general, when the front part 11 is in place and the terminal post is closed, the panel 14 would not be swingable due to its most right-hand edge abutting the inside wall of the front part 11. However, once the front part 11 is removed, a retaining screw 24 ensures that the panel 14 cannot be moved laterally to the right, so that it remains securely engaged with the groove 23.

Figure 4:
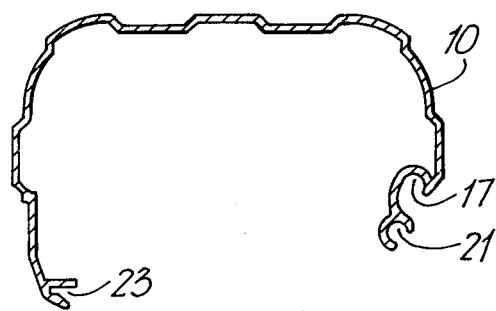
FIG. 4 is the back part of the cross-section shown in FIG. 3.
Figure 5:
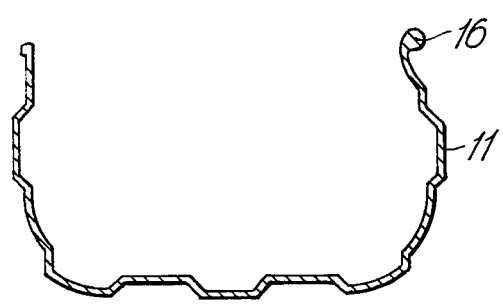
FIG. 5 is the front part of the cross-section shown in FIG. 3.
Figure 6:
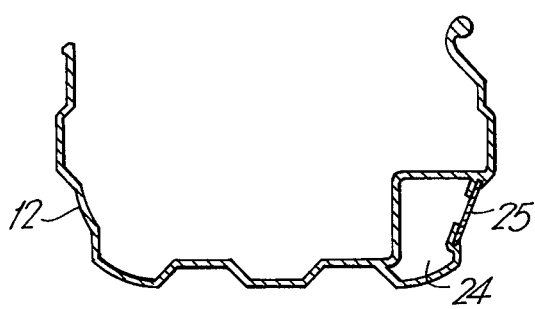
FIG. 6 is a separate bottom portion of the front part.

FIG. 4 of the drawings is a cross-section of the back part 10 alone, while FIG. 5 is the cross-section of the top front part 11. FIG. 6 is a cross-section of the bottom front part 12 with a so-called "service wire channel" 24 in the corner. This channel 24 serves the installation of service wires if they are added after the distribution cable has been installed and they therefore cannot enter inside the terminal post from below the bottom of the front part 12. A plastic strip 25 slides in to cover the opening of the channel 24.

Figure 7:
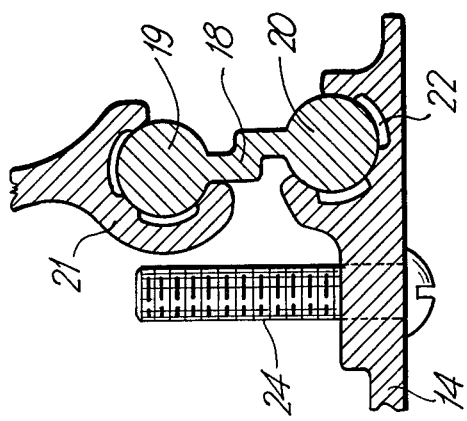
FIG. 7 is an enlargement of a portion of FIG. 3.

FIG. 7 is an enlargement of the link member 18 in the channels 21 and 22 in cross-section as shown in FIG. 3. As may be seen the inside surfaces of the channels 21 and 22 are not perfectly cylindrical but have three equally spaced bearing pads each protruding 0.025" from the inside cylindrical surface in order to reduce friction by insertion and rotation.

Figure 8:
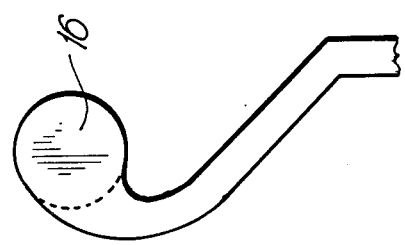
FIG. 8 is an enlargement of a portion of FIG. 5.

FIG. 8 is an enlargement of the bead 16 in the front part 11 as shown in FIG. 3. The bead itself is a cylinder of 0.245" diameter by a wall thickness of the extruded parts of 0.072". The channel 17 (FIG. 3) must of course be compatible with the bead and its convexly curved side, such that by rotation counter-clockwise the bead 16 disengages from the channel 17 with ease.

As may be seen from the above-detailed description, the panel 14, supporting the terminal blocks, may slide vertically relative to the post itself following the movement of the buried cable. The incoming distribution cable enters the terminal post from the bottom and is connected to the terminal blocks 30 from behind the panel 14. The service wires (i.e. the wires leading to the subscriber premises) are terminated from the front of the panel 14. Most of the changes in connection after installation are in the service wire termination, hence the easy frontal accessibility. Should changes in connections of the distribution cable be necessary, which is sometimes necessary, the panel 14 may be swung open fully to permit frontal access as well. Usually more than one panel will be used, one supporting the terminal blocks and the other for terminating the so-called armor wire of cable, which is to be connected to ground. During cable installation and splicing both panels would be stopped from movement by a screw in a slidable cylindrical stop below the lowest panel in the channel 21. Once installation is complete the stop must be released and the panels will be held in place by the cable sheath bonding clamp and are thus free to follow its movement.

What is claimed is:

1. A terminal post housing for wire connector blocks and the like comprising:

a hollow housing having a removeable front part and a back part, one of said front and back parts having a vertical arcuate channel in its outer surface proximate and parallel to its edge adapted to receive and engage, by rotation relative to the other of said front and back parts into closed positions, a bead of compatible shape and cross-section along at least a portion of an opposite edge of said other part; and inside said terminal post housing a vertical panel or frame for supporting said wire connector blocks and the like, hinged at one vertical edge thereof to said back part of the housing such as to permit substantial frontal access to its back side when said front part is removed.

2. The terminal post housing of claim 1, having a lower front part identical to said front part except for an open channel in one of its corners, for accommodation and introduction of wires into said terminal post; said lower front part being immediately below said front part.

3. The terminal post housing of claim 1, said vertical panel or frame being doubly hinged to said back part.

4. The terminal post housing of claim 3, said front and back parts of extruded aluminum.

5. The terminal post housing of claim 4, said link member being of extruded aluminum.

6. The terminal post housing of claim 4, having a lower front part identical to said front part except for an open channel in one of its corners, for accommodation and introduction of wires into said terminal post; said lower front part being immediately below said front part.

7. The terminal post housing of claim 4, said vertical panel or frame being hinged to said back part by a link member having two cylindrical beads along opposite edges, one bead inserted in a compatible channel in said back part and the other in a similar channel in said panel or frame, whereby said panel or frame is rotatable around an angle of not substantially less than 180°.

8. The terminal post housing of claim 7, having a lower front part identical to said front part except for an open channel in one of its corners, for accommodation and introduction of wires into said terminal post; said lower front part being immediately below said front part.

* * * * *